United States Patent
Fisher et al.

(10) Patent No.: US 11,697,452 B2
(45) Date of Patent: Jul. 11, 2023

(54) SOLID STATE MOTOR DAMPING

(71) Applicant: STEERING SOLUTIONS IP HOLDING CORPORATION, Saginaw, MI (US)

(72) Inventors: Paul M. Fisher, Saginaw, MI (US); David P. Holm, Brant, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 610 days.

(21) Appl. No.: 16/784,368

(22) Filed: Feb. 7, 2020

(65) Prior Publication Data

US 2020/0256421 A1 Aug. 13, 2020

Related U.S. Application Data

(60) Provisional application No. 62/802,869, filed on Feb. 8, 2019.

(51) Int. Cl.
| | |
|---|---|
| *B62D 5/04* | (2006.01) |
| *F16F 15/027* | (2006.01) |
| *F16F 13/26* | (2006.01) |

(52) U.S. Cl.
CPC ............. *B62D 5/0457* (2013.01); *B62D 5/04* (2013.01); *B60G 2800/963* (2013.01); *F16F 13/26* (2013.01); *F16F 15/027* (2013.01)

(58) Field of Classification Search
CPC .................................. B62D 5/04; B62D 5/0457
See application file for complete search history.

(56) References Cited

U.S. PATENT DOCUMENTS

| | | | |
|---|---|---|---|
| 2013/0277138 A1* | 10/2013 | Arai | H02H 7/0833 |
| | | | 361/33 |
| 2014/0184107 A1 | 7/2014 | Maekawa et al. | |
| 2018/0037252 A1 | 2/2018 | Yamamoto et al. | |

FOREIGN PATENT DOCUMENTS

| | | | |
|---|---|---|---|
| CN | 103296942 A | 9/2013 | |
| CN | 108155628 A | 6/2018 | |
| DE | 112017001146 T5 * | 11/2018 | ........... B62D 5/0457 |

(Continued)

OTHER PUBLICATIONS

First Office Action and Search Report from The Chinese Patent Office for related Chinese Patent Application No. 202010085127.3 dated Jan. 20, 2023, 16 pages.

*Primary Examiner* — Melanie Torres Williams
(74) *Attorney, Agent, or Firm* — Dickinson Wright PLLC

(57) ABSTRACT

A method includes determining whether a multiphase electric machine is unstable. The method also includes, in response to a determination that the multiphase electric machine is unstable, setting a gate voltage of a first three terminal semiconductor switch to zero. The method also includes, in response to a determination that the multiphase electric machine is stable, setting the gate voltage of the first three terminal semiconductor switch to nonzero. The method also includes, in response to the first three terminal semiconductor switch being set to zero, increasing electrical conduction from one phase of the multiphase electric machine to another phase of the multiphase electric machine. The method includes, in response to the first three terminal semiconductor switch being set to nonzero, increasing electrical resistance from the one phase of the multiphase electric machine to the another phase of the multiphase electric machine.

15 Claims, 4 Drawing Sheets

(56) References Cited

FOREIGN PATENT DOCUMENTS

| | | | |
|---|---|---|---|
| JP | H09290762 | 11/1997 | |
| JP | 2002249062 | 9/2002 | |
| JP | 2010047096 A | 3/2010 | |
| JP | 6456529 B1 * | 1/2019 | ............. H02P 25/18 |
| WO | 2015019653 A1 | 2/2015 | |
| WO | WO-2018159101 A1 * | 9/2018 | ............... B62D 5/04 |
| WO | WO-2018180237 A1 * | 10/2018 | ............... B62D 5/04 |

* cited by examiner

SOLID STATE MOTOR DAMPING

CROSS-REFERENCES TO RELATED APPLICATIONS

This patent application claims priority to U.S. Provisional Patent Application Ser. No. 62/802,869, filed Feb. 8, 2019, which is incorporated herein by reference in its entirety.

BACKGROUND OF THE INVENTION

This application relates to motor damping for steer by wire applications.

Vehicles may be maneuvered by electrically actuated wheels. The orientation of the electrically actuated wheels may be directed by an electric machine or motor. Due to a loss in power or other circumstances, the electric machine may become uncontrolled or unstable such that the wheel orientation oscillates.

Accordingly, it is desirable to mitigate such oscillation and reduce instability.

SUMMARY OF THE INVENTION

An aspect of the disclosed embodiments includes aa vehicle that includes a multiphase electric machine configured to orient a wheel associated with a rear axle of the vehicle. The vehicle further includes a first three terminal semiconductor switch configured to increase electrical conduction from a one phase of the multiphase electric machine to another phase of the multiphase electric machine when a gate voltage of the semiconductor switch is zero. The first three terminal semiconductor switch is configured to increase electrical resistance from the one phase of the multiphase electric machine to the other phase of the multiphase electric machine when the gate voltage of the semiconductor switch is nonzero.

Another aspect of the disclosed embodiments includes a system for a vehicle. The system includes a multiphase electric machine configured to orient a wheel associated with a rear axle of the vehicle. The system also includes a first three terminal semiconductor switch configured to increase electrical conduction from one phase of the multiphase electric machine to another phase of the multiphase electric machine in response to a gate voltage of the first three terminal semiconductor switch being zero. The first three terminal semiconductor switch is configured to increase electrical resistance from the one phase of the multiphase electric machine to the other phase of the multiphase electric machine in response to the gate voltage of the first three terminal semiconductor switch being nonzero.

Another aspect of the disclosed embodiments includes a system for a vehicle. The system includes a multiphase electric machine and a controller. The multiphase electric machine is configured to orient a wheel associated with a rear axle of the vehicle. The controller is configured to: determine whether the multiphase electric machine is unstable; in response to a determination that the multiphase electric machine is unstable, set a gate voltage of a first three terminal semiconductor switch to zero; and in response to a determination that the multiphase electric machine is stable, set the gate voltage of the first three terminal semiconductor switch to nonzero.

Another aspect of the disclosed embodiments includes method. The method includes determining whether a multiphase electric machine is unstable, the multiphase electric machine being configured to orient a wheel associated with a rear axle of a vehicle. The method also includes, in response to a determination that the multiphase electric machine is unstable, setting a gate voltage of a first three terminal semiconductor switch to zero. The method also includes, in response to a determination that the multiphase electric machine is stable, setting the gate voltage of the first three terminal semiconductor switch to nonzero. The method also includes, in response to the first three terminal semiconductor switch being set to zero, increasing electrical conduction from one phase of the multiphase electric machine to another phase of the multiphase electric machine. The method includes, in response to the first three terminal semiconductor switch being set to nonzero, increasing electrical resistance from the one phase of the multiphase electric machine to the another phase of the multiphase electric machine.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
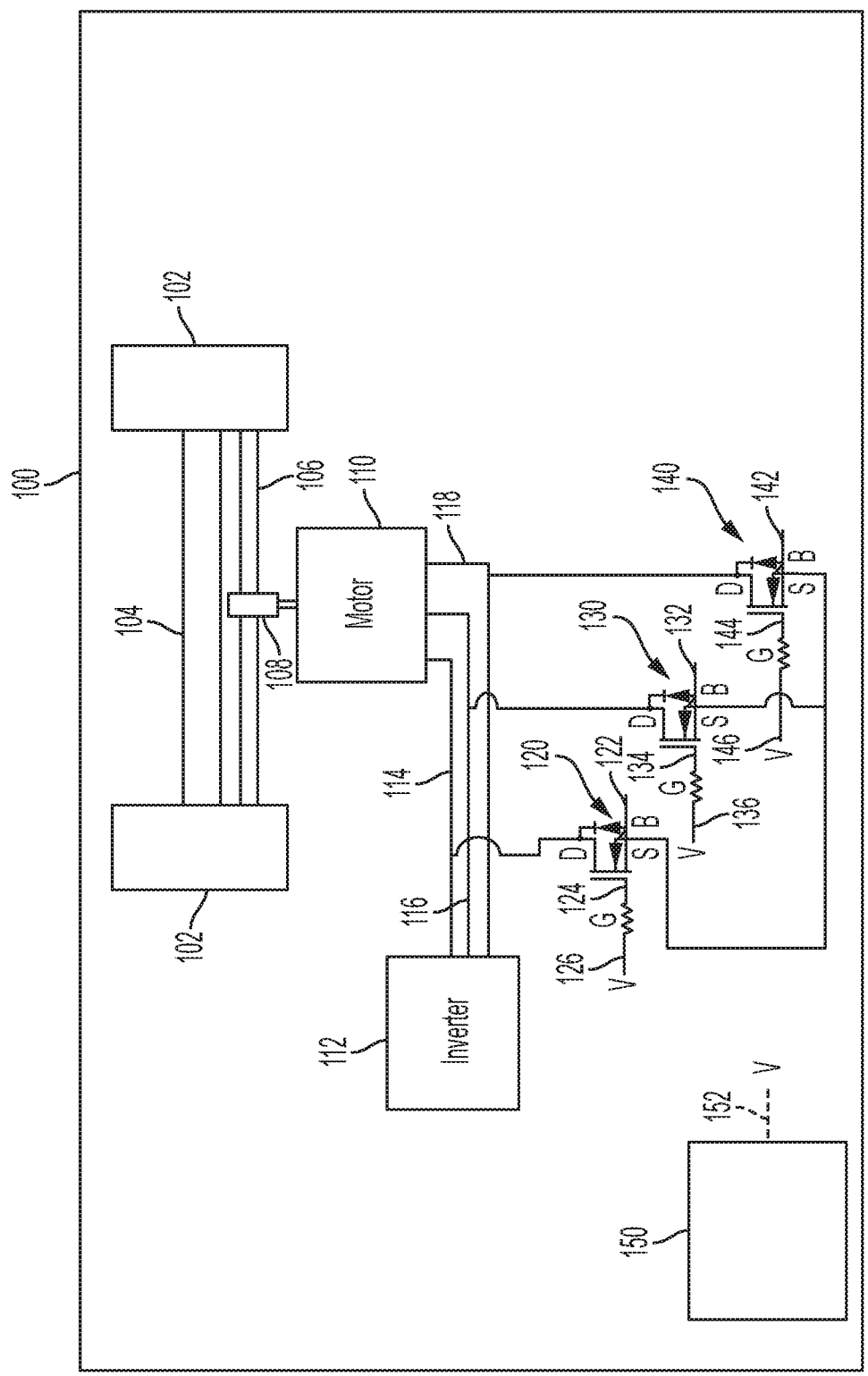
FIG. 1 generally illustrates a vehicle having a multiphase electric machine and N-doped semiconductors configured to selectively short each of the three phases of the motor according to the principles of the present disclosure.

Vehicular steering systems may be augmented with rear wheel steering. Rear wheel steering may be implemented using a steer by wire technique with minimal mechanical linkages to the steering column. The steer by wire system uses a controlled electric motor to adjust wheel orientation. The electric motor may be connected to a rack or other various steering mechanisms to adjust wheel orientation. During a loss of power or other motor malfunction situations, the electric motor may become uncontrolled or unstable. As such, semiconductor switches may be implemented to automatically control and stabilize the electric machine. Electric machine stabilization may be achieved by shorting back electromagnetic forces from the rotation of the rotor within the stator to other phases of the stator. That is, each phase of the electric machine is shorted together during an uncontrolled transient event to dampen—and likely remove—motor oscillations.

In some embodiments, the systems and methods described herein may include a multiphase electric machine configured to orient a wheel associated with a rear axle of the vehicle. The systems and methods described herein may include a first three terminal semiconductor switch configured to increase electrical conduction from one phase of the multiphase electric machine to another phase of the multiphase electric machine in response to a gate voltage of the first three terminal semiconductor switch being zero. The first three terminal semiconductor switch may be configured to increase electrical resistance from the one phase of the multiphase electric machine to the other phase of the multiphase electric machine in response to the gate voltage of the first three terminal semiconductor switch being nonzero.

In some embodiments, the systems and methods described herein may include a controller that, responsive to operation of the multiphase electric machine being unstable, operates the first three terminal semiconductor switch such that the gate voltage of the first three terminal semiconductor switch is zero. In some embodiments, the systems and methods described herein may include a second three terminal semiconductor switch that selectively conducts electricity from the other phase to the one phase through a body diode of the second three terminal semiconductor switch. The controller, responsive to operation of the multiphase electric machine being unstable, operates the second three terminal semiconductor switch such that electricity is conducted from the other phase to the one phase.

In some embodiments, the systems and methods described herein may include a second three terminal semiconductor switch configured to increase electrical conduction from the other phase of the multiphase electric machine to the one phase of the multiphase electric machine in response to a gate voltage of the second three terminal semiconductor switch being zero. In some embodiments, the second three terminal semiconductor switch is further configured to increase electrical resistance from the other phase of the multiphase electric machine to the one phase of the multiphase electric machine in response to the gate voltage of the second three terminal semiconductor switch being nonzero.

In some embodiments, the first three terminal semiconductor switch includes a depletion mode MOSFET. In some embodiments, the nonzero gate voltage is negative with respect to a source voltage of the first three terminal semiconductor switch. In some embodiments, the first three terminal semiconductor switch includes an N-doped semiconductor switch. In some embodiments, the nonzero gate voltage is positive with respect to a source voltage of the first three terminal semiconductor switch. In some embodiments, the first three terminal semiconductor switch includes a P-doped semiconductor switch.

In some embodiments, the systems and methods described herein may include a multiphase electric machine and a controller. The multiphase electric machine is configured to orient a wheel associated with a rear axle of the vehicle. The controller is configured to: determine whether the multiphase electric machine is unstable; in response to a determination that the multiphase electric machine is unstable, set a gate voltage of a first three terminal semiconductor switch to zero; and in response to a determination that the multiphase electric machine is stable, set the gate voltage of the first three terminal semiconductor switch to nonzero.

In some embodiments, the systems and methods described herein may include determining whether a multiphase electric machine is unstable, the multiphase electric machine being configured to orient a wheel associated with a rear axle of a vehicle. In some embodiments, the systems and methods described herein may include, in response to a determination that the multiphase electric machine is unstable, setting a gate voltage of a first three terminal semiconductor switch to zero. In some embodiments, the systems and methods described herein may include, in response to a determination that the multiphase electric machine is stable, setting the gate voltage of the first three terminal semiconductor switch to nonzero. In some embodiments, the systems and methods described herein may include, in response to the first three terminal semiconductor switch being set to zero, increasing electrical conduction from one phase of the multiphase electric machine to another phase of the multiphase electric machine. In some embodiments, the systems and methods described herein may include, in response to the first three terminal semiconductor switch being set to nonzero, increasing electrical resistance from the one phase of the multiphase electric machine to the another phase of the multiphase electric machine.

Referring now to the Figures, where the invention will be described with reference to specific embodiments, without limiting same, in FIG. 1 a vehicle 100 is shown. Vehicle 100 may be any type of vehicle including cars, trucks, boats, aircraft, and spacecraft, for example. Additionally, any mode of propulsion may be used by these vehicles (e.g., internal combustion engine, electric motor, hybrid drive, fuel cells). The vehicle may include a wheel 102 or set of wheels 102 with an axle 104 therebetween. The wheels 102 may be oriented by an electric machine or motor 110 that drives a pinion 108 and rack 106. It should be appreciated that any steering mechanisms, known or unknown, may be used. The steering mechanism may be an Ackerman, bell-crank, rack and pinion, or another implement, for example.

The electric machine 110 may be any type of electric machine. For example, the electric machine may have one or more phases. The electric machine 110 may have any type of winding configuration or rotor configuration. For example, the electric machine 110 may be brushed or brushless. The electric machine 110 may be permanent magnet, inductive, or any other suitable type. The electric machine 110 may be any other type of known or unknown configuration that converts electrical energy into mechanical energy. The electric machine 110 may be driven by an inverter configured to generate sinusoidal waveforms from a direct current (DC) source. The DC source may be a battery, an alternator, or another electrical source. As shown, the electric machine 110 is driven by three phases 114, 116, 118. Any number of phases may be used to operate the electric machine (e.g., 1, 3, 5, 7).

As shown in FIG. 1, each phase 114, 116, 118 includes a tap that is connected to a drain of respective three terminal semiconductor switches 120, 130, 140. As shown, the semiconductor switches 120, 130, 140 are metal-oxide-semiconductor field-effect transistor (MOSFET) devices. The semiconductor switches 120, 130, 140 may be any type of three terminal device that include but are not limited to bipolar junction transistors (BJT), insulated-gate bipolar transistors (IGBT), and junction gate field-effect transistors (JFET). The semiconductor switches 120, 130, 140 may be configured in a depletion mode such that a zero voltage at the gate provides a closed switch 120, 130, 140. The switches 120, 130, 140 may include body diodes 122, 132, 142 based on the type of semiconductor switch used. The body diodes 122, 132, 142 may be inherent to the semiconductor device (e.g., MOSFETs) or added separately as a Schottky diode or other type of diode. The switch may be normally closed or ON without a voltage being applied or voltage being equal to the reference source voltage. As shown in FIG. 1 the semiconductor switches 120, 130, 140 are N-doped, such that a negative voltage is required to open the switches 120, 130, 140.

A controller 150 is configured to control the three terminal semiconductor switches 120, 130, 140 through gates 124, 134, 144, respectively. The gates 124, 134, 144 may be driven by a gate driver or directly driven from the controller 150. The gates 124, 134, 144 may be driven from voltage provided by the controller 150 or by other means. The three terminal semiconductor switches 120, 130, 140 may further include drop resistors and input connections 126, 136, 146 to receive control signals. The controller 150 may include one or more output control terminals 152 for individually or collectively controlling the three terminal semiconductor switches 120, 130, 140. The controller 150 may include logic to detect whether the electric machine 110 is in an uncontrolled state. The controller 150 may operate the switches based on a loss of power. That is, if the power is lost, the controller 150 operates the switches by removing the negative latching voltage from the gates 126, 136, 146. The removal may be passive such that a loss of a power source to the controller 150 automatically removes the voltage from the gates 126, 136, 146 by virtue of the power not being supplied. The removal may be active such that the controller 150 is configured to counteract a loss of power by actively removing voltage from the gates 126, 136, 146, or a combination thereof.

The controller 150 may be any type of a controller known in the art. The controller 150 may include any combination of processors, circuitry, memory, controllers, hardware, software, or a combination thereof. For example, the controller 150 may include any suitable processor, such as those described herein and may include or be in communication with a memory. The memory may include Random Access Memory (RAM), a Read-Only Memory (ROM), or a combination thereof. The memory may store programs, utilities, or processes to be executed in by the processor. The memory may provide volatile data storage, and stores instructions related to the operation of the computing device. The memory may include instructions that, when executed by the processor, cause the processor to, at least, perform the methods and/or the functions of the systems described herein.

The controller 150 may be programmed using computing languages that include machine code, assembly, C, C++, COBOL, Python, or other computing languages known or unknown. The controller 150 may include any form of logic to carry out algorithms necessary to operate the three terminal semiconductor switches. Additionally, the three terminal semiconductor switches 120, 130, 140 may be configured with the gates 126, 136, 146 connected directly to a power source, requiring no logic to properly actuate. That is, the gates may be powered by a bus such that loss of power to the bus would remove power from the gates.

Figure 2:
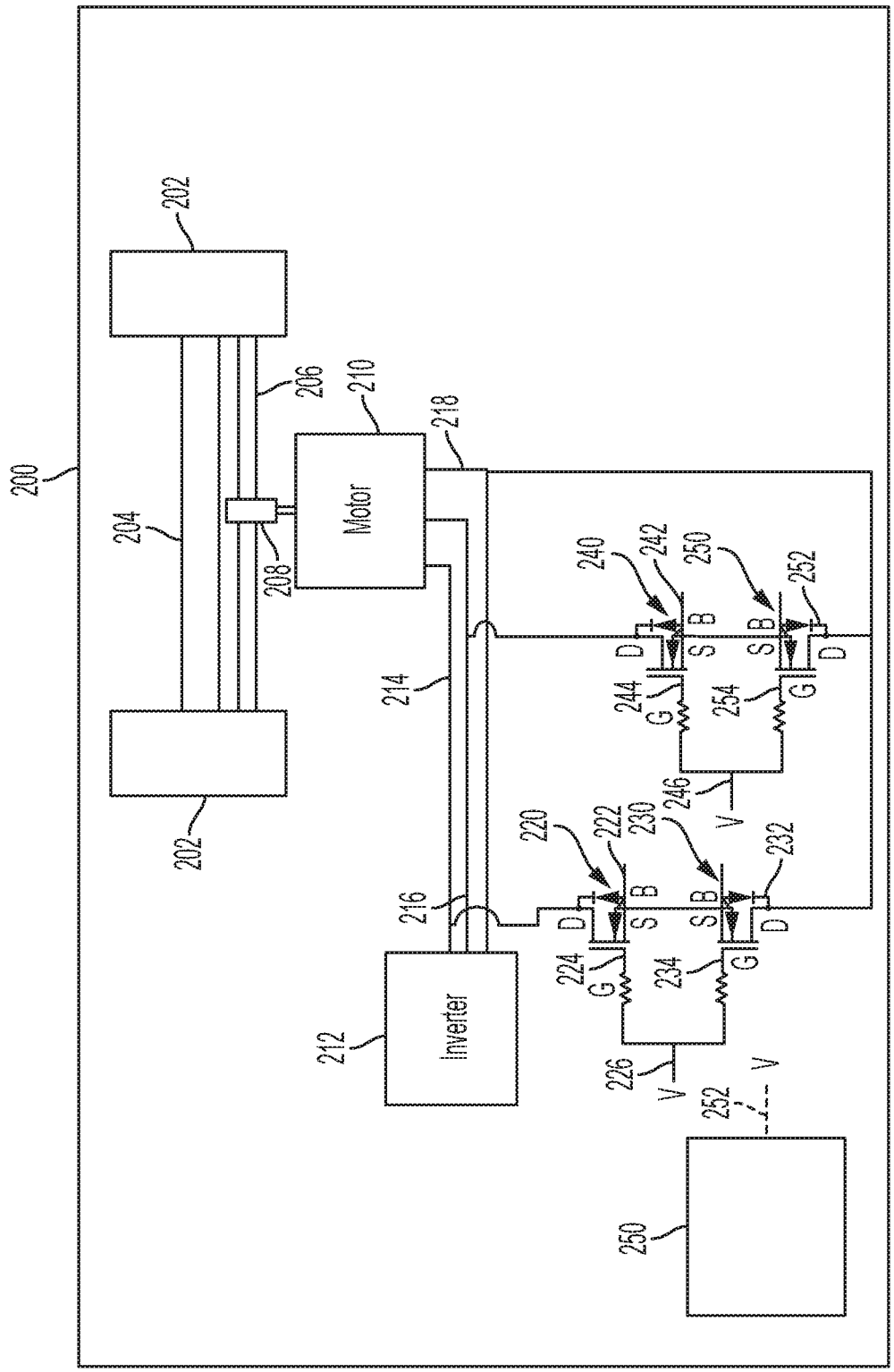
FIG. 2 generally illustrates a vehicle having a multiphase electric machine and opposed N-doped semiconductors on less than all phases of the multiphase electric machine being configured to selectively short the all of the phases of the multiphase electric machine according to the principles of the present disclosure.

Referring to FIG. 2, a vehicle 200 is shown. The vehicle may include a wheel 202 or set of wheels 202 with an axle 204 therebetween. The wheels 202 may be oriented by an electric machine or motor 210 that drives a pinion 208 and rack 206.

The electric machine 210 may be any type of electric machine. For example, the electric machine may have one or more phases. The electric machine 210 may have any type of winding configuration or rotor configuration. For example, the electric machine 210 may be brushed or brushless. The electric machine 210 may be permanent magnet, inductive, or any other suitable type. The electric machine 210 may be any other type of known or unknown configuration that converts electrical energy into mechanical energy. The electric machine 210 may be driven by an inverter configurated to generate sinusoidal waveforms from a direct current (DC) source. The DC source may be a battery, an alternator, or another electrical source. As shown, the electric machine 210 is driven by three phases 214, 216, 218. Any number of phases may be used to operate the electric machine (e.g., 2, 4, 6, 8).

In FIG. 2, taps of respective electric machine phases 214, 216, 218 are shown. This configuration includes a set of a pair of three terminal semiconductor switches 220, 230 and 240, 250, in an opposed configuration, respectively. The three terminal semiconductor switches 220, 230, 240, 250 provide bidirectional current control. As such, one of the phases 218 of the electric machine 210 may be connected to the other two phases through the opposing three terminal semiconductor switches 220, 230, 240, 250. As the electric machine 210 becomes unstable, the opposing three terminal semiconductor switches 220, 230, 240, 250 are actuated to short the phases 214, 216, 218 of the electric machine 210 to dampen the unstable operation.

A controller 250 is configured to control the three terminal semiconductor switches 220, 230, 240, 250 through gates 224, 234, 244, 254, respectively. The controller 250 may include features similar to the controller 150 and/or may include additional or fewer features than the controller 150. The gates 224, 234, 244, 254 may be driven by a gate driver or directly from the controller 250. The gates 224, 234, 244, 254 may be driven from voltage provided by the controller 250 or by other means. The three terminal semiconductor switches 220, 230, 240, 250 may further include drop resistors and input connections 224, 234, 244, 254 to receive control signals. The controller 250 may include one or more output control terminals 252 for individually or collectively controlling the three terminal semiconductor switches 220, 230, 240, 250. The controller 250 may include logic to detect whether the electric machine 210 is in an uncontrolled state. The controller 250 may operate the switches based on a loss of power. That is, if the power is lost, the controller 250 operates the switches by removing the negative latching voltage from the gates 224, 234, 244, 254. The removal may be passive or active in the case of a loss of a power source to the controller 250. For example, in a passive embodiment, the controller 250 automatically removes the voltage from the gates 224, 234, 244, 254. In an active embodiment, the controller 250 is configured to counteract a loss of power by actively removing voltage from the gates 224, 234, 244, 254. It is further contemplated that a combination of passive and active voltage removal is employed.

Additionally, the three terminal semiconductor switches 220, 230, 240, 250 may be configured with the gates 224, 234, 244, 254 connected directly to a power source, requiring no logic to properly actuate. That is, the gates 224, 234, 244, 254 may be powered by a bus such that loss of power to the bus would remove power from the gates 224, 234, 244, 254.

Figure 3:
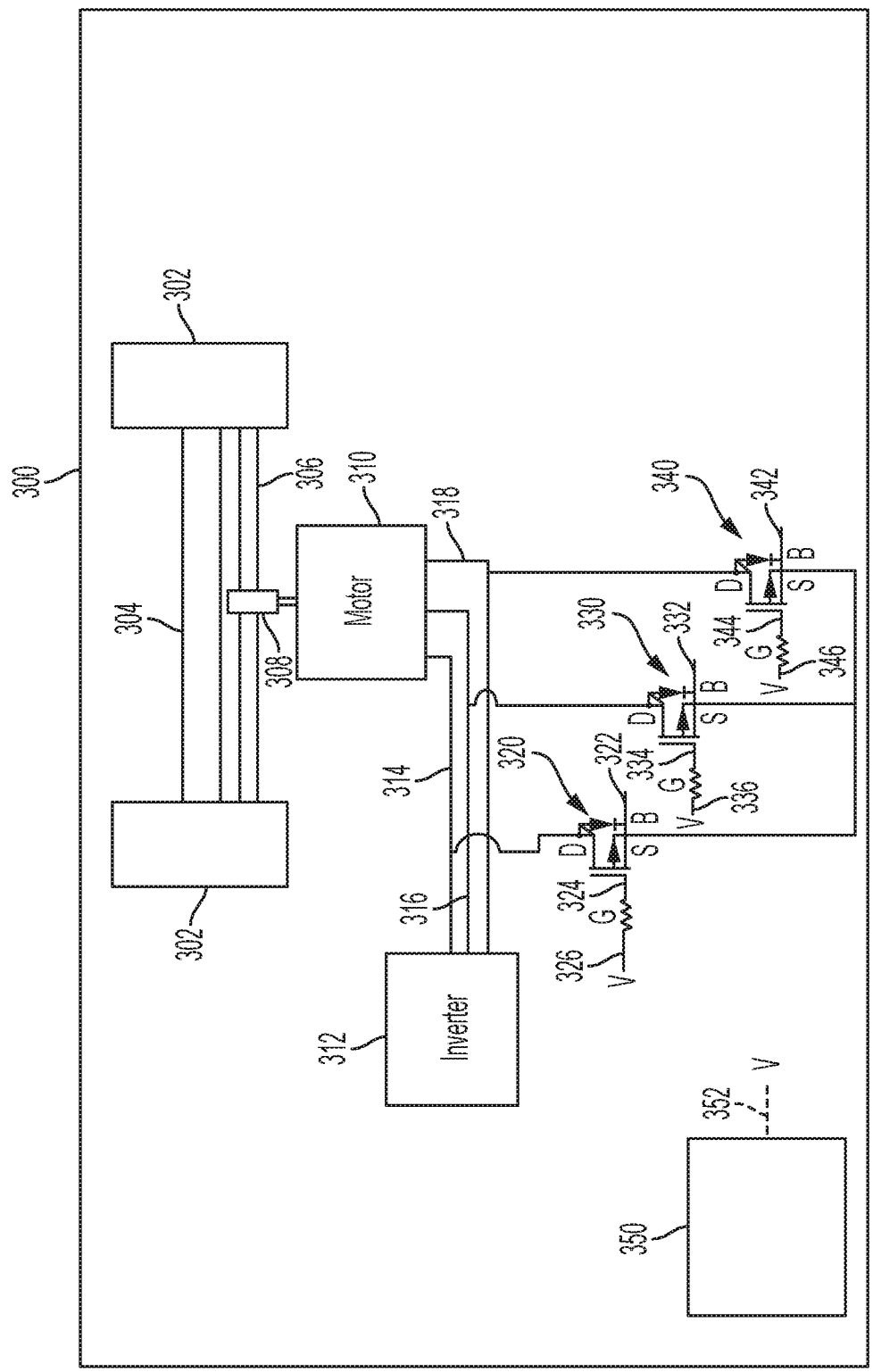
FIG. 3 generally illustrates a vehicle having a multiphase electric machine and P-doped semiconductors configured to selectively short each of the three phases of the motor according to the principles of the present disclosure.

Referring to FIG. 3, a vehicle 300 is shown. The vehicle may include a wheel 302 or set of wheels 302 with an axle 304 therebetween. The wheels 302 may be oriented by an electric machine or motor 310 that drives a pinion 308 and rack 306.

The electric machine 310 may be any type of electric machine. For example, the electric machine may have one or more phases. The electric machine 310 may have any type of winding configuration or rotor configuration. The electric machine 310 may be permanent magnet, inductive, or any other suitable type. The electric machine 310 may be any other type of known or unknown configuration that converts electrical energy into mechanical energy. The electric machine 310 may be driven by an inverter configured to generate sinusoidal waveforms from a direct current (DC) source. The DC source may be a battery, an alternator, or another electrical source. As shown, the electric machine 310 is driven by three phases 314, 316, 318. Any number of phases may be used to operate the electric machine (e.g., 1, 3, 5, 7).

As shown in FIG. 3, each phase 314, 316, 318 includes a tap that is connected to a drain of respective three terminal semiconductor switches 320, 330, 340. The semiconductor switches 320, 330, 340 are metal-oxide-semiconductor field-effect transistor (MOSFET) devices as shown. The semiconductor switches 320, 330, 340 may be any type of three terminal device that include but are not limited to bipolar junction transistors (BJT), insulated-gate bipolar transistors (IGBT), and junction gate field-effect transistors (JFET). The semiconductor switches 320, 330, 340 may be configured in a depletion mode such that a zero voltage at the gate provides a closed switch 320, 330, 340. The switches 320, 330, 340 may include body diodes 322, 332, 342 based on the type of semiconductor switch used. The body diodes 322, 332, 342 may be inherent to the semiconductor device (e.g., MOSFETs) or added separately as a Schottky diode or other type of diode. As such the switch is normal closed or ON without a voltage being applied. As shown in FIG. 3 the semiconductor switches 320, 330, 340 are P-doped, such that a positive voltage is required to open the switches 320, 330, 340.

A controller 350 is configured to control the three terminal semiconductor switches 320, 330, 340 through gates 324, 334, 344, respectively. The controller 250 may include features similar to the controller 150 and/or may include additional or fewer features than the controller 150. The gates 324, 334, 344 may be driven by a gate driver or directly from the controller 350. The gates 324, 334, 344 may be driven from voltage provided by the controller 350 or by other means. The three terminal semiconductor switches 320, 330, 340 may further include drop resistors and input connections 326, 336, 346 to receive control signals. The controller 350 may include one or more output control terminals 352 for individually or collectively controlling the three terminal semiconductor switches 320, 330, 340. The controller 350 may include logic to detect whether the electric machine 310 is in an uncontrolled state. The controller 350 may operate the switches based on a loss of power. That is, if the power is lost, the controller 350 operates the switches by removing the negative latching voltage from the gates 326, 336, 346. The removal may be passive or active in the case of a loss of a power source to the controller 350. For example, in a passive embodiment, the controller 350 automatically removes the voltage from the gates 326, 336, 346. In an active embodiment, the controller 350 is configured to counteract a loss of power by actively removing voltage from the gates 326, 336, 346. It is further contemplated that a combination of passive and active voltage removal is employed.

Additionally, the three terminal semiconductor switches 320, 330, 340 may be configured with the gates 324, 334, 344 connected directly to a power source, requiring no logic to properly actuate. That is, the gates 324, 334, 344 may be powered by a bus such that loss of power to the bus would remove power from the gates 324, 334, 344.

Figure 4:
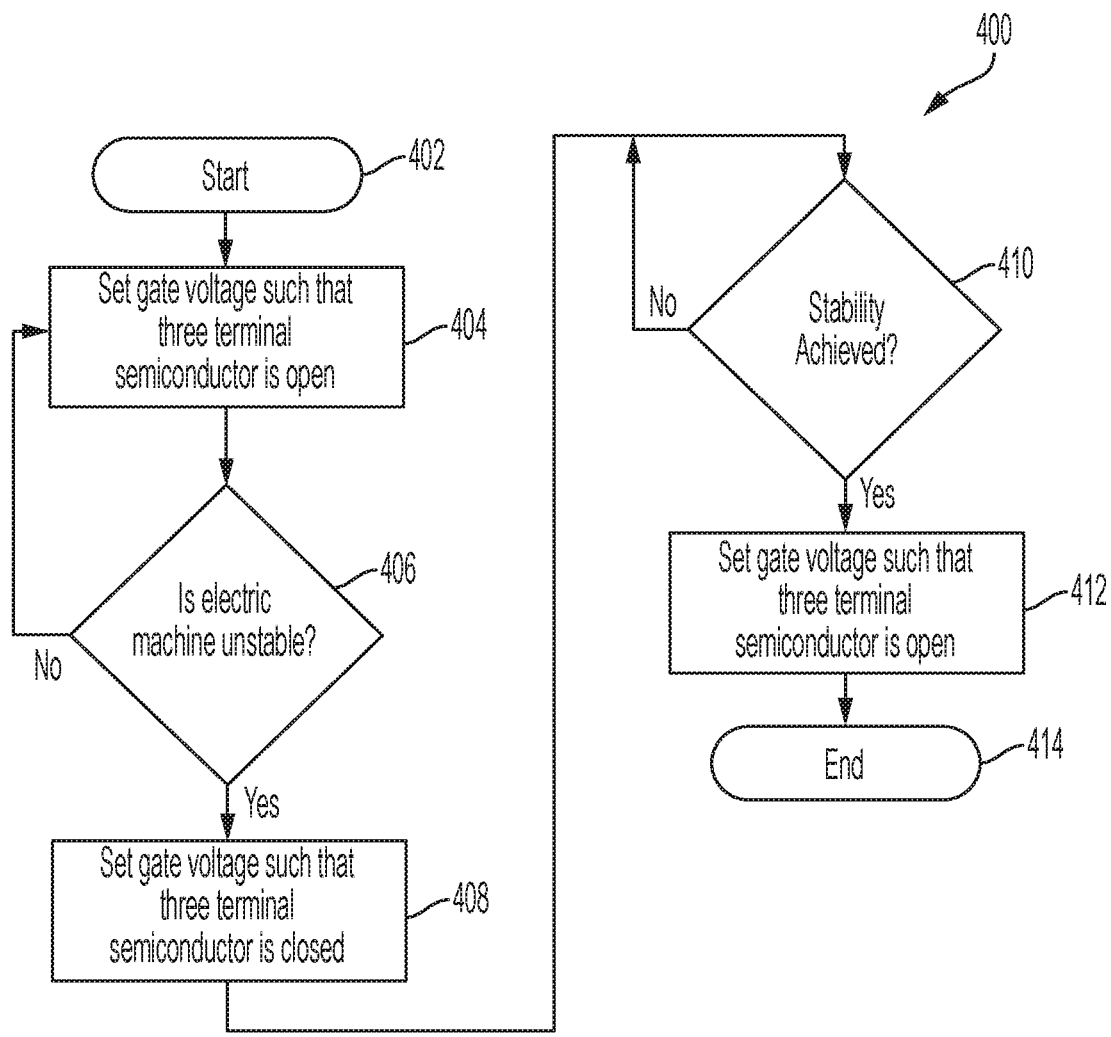
FIG. 4 is a flow diagram generally illustrated a method for damping oscillations of an uncontrolled electric machine according to the principles of the present disclosure.

FIG. 4 is a flow diagram generally illustrating a method 400 according to the principles of the present disclosure. The method 400 begins in step 402. In step 404, the controller, such as the controller 150, the controller 250, the controller 350, or any suitable controller or another implement sets the gate voltage such that the three terminal semiconductor is open. That is, in step 404 the phases of the electric machine are not shorted.

In step 406, the controller or other implement determines whether the electric machine is unstable or uncontrollable. This determination may be made by the controller through received sensory information or predictions based on control algorithms and other guidance. For example, the controller may receive sensor data from an suitable sensor configured to sense various characteristics of the electric machine. The controller may receive the sensor data and may analyze the sensor data to determine whether the electric machine is unstable. The controller may determine that the electric machine is unstable using any suitable technique including those described herein and any other suitable technique not described herein. Additionally, the controller may passively or actively determine whether power has been lost to the electric machine through digital inputs or emergency shutdown procedures. Any type of determination, active or passive, is contemplated by this disclosure.

In step 408, the controller or other implement sets the gate voltage of the three terminal semiconductor or semiconductors to closed. As such, the phases of the electric machine are shorted. The shorted phases provide damping of oscillations and uncontrolled movement of the electric machine. In step 410, the controller or other implement determines whether stability has been achieved. After stability has been achieved, the controller sets the gate voltage of the three terminal semiconductor such that the path from source to drain is open in step 412. In step 414, the method 400 ends, or repeats. It should be appreciated that the method 400 may omit, replace, duplicate, or otherwise be changed, as necessary. It should be appreciated that any combination of components may be interchanged or substituted for other components that perform similar functions as described or not described.

In some embodiments, a system for a vehicle includes a multiphase electric machine configured to orient a wheel associated with a rear axle of the vehicle. The system also includes a first three terminal semiconductor switch configured to increase electrical conduction from one phase of the multiphase electric machine to another phase of the multiphase electric machine in response to a gate voltage of the first three terminal semiconductor switch being zero. The first three terminal semiconductor switch is configured to increase electrical resistance from the one phase of the multiphase electric machine to the other phase of the multiphase electric machine in response to the gate voltage of the first three terminal semiconductor switch being nonzero.

In some embodiments, the system also includes a controller, responsive to operation of the multiphase electric machine being unstable, operates the first three terminal semiconductor switch such that the gate voltage of the first three terminal semiconductor switch is zero. In some embodiments, the system also includes a second three terminal semiconductor switch selectively conducting electricity from the other phase to the one phase through a body diode of the second three terminal semiconductor switch, and the controller, responsive to operation of the multiphase electric machine being unstable, operates the second three terminal semiconductor switch such that electricity is conducted from the other phase to the one phase. In some embodiments, the system also includes a second three terminal semiconductor switch configured to increase electrical conduction from the other phase of the multiphase electric machine to the one phase of the multiphase electric machine in response to a gate voltage of the second three terminal semiconductor switch being zero. In some embodiments, the second three terminal semiconductor switch is further configured to increase electrical resistance from the other phase of the multiphase electric machine to the one phase of the multiphase electric machine in response to the gate voltage of the second three terminal semiconductor switch being nonzero. In some embodiments, the first three terminal semiconductor switch includes a depletion mode MOSFET. In some embodiments, the nonzero gate voltage is negative with respect to a source voltage of the first three terminal semiconductor switch. In some embodiments, the first three terminal semiconductor switch includes an N-doped semiconductor switch. In some embodiments, the nonzero gate voltage is positive with respect to a source voltage of the first three terminal semiconductor switch. In some embodiments, the first three terminal semiconductor switch includes a P-doped semiconductor switch.

In some embodiments, a system for a vehicle includes a multiphase electric machine and a controller. The multiphase electric machine is configured to orient a wheel associated with a rear axle of the vehicle. The controller is configured to: determine whether the multiphase electric machine is unstable; in response to a determination that the multiphase electric machine is unstable, set a gate voltage of a first three terminal semiconductor switch to zero; and in response to a determination that the multiphase electric machine is stable, set the gate voltage of the first three terminal semiconductor switch to nonzero.

In some embodiments, the first three terminal semiconductor switch is configured to increase electrical conduction from one phase of the multiphase electric machine to another phase of the multiphase electric machine in response to the gate voltage of the first three terminal semiconductor switch being zero. In some embodiments, the first three terminal semiconductor switch is configured to increase electrical resistance from one phase of the multiphase electric machine to another phase of the multiphase electric machine in response to the gate voltage of the first three terminal semiconductor switch being nonzero. In some embodiments, the system also includes a second three terminal semiconductor switch configured to increase electrical conduction from the other phase of the multiphase electric machine to the one phase of the multiphase electric machine in response to a gate voltage of the second three terminal semiconductor switch being zero. In some embodiments, the system also includes a second three terminal semiconductor switch configured to increase electrical resistance from the other phase of the multiphase electric machine to the one phase of the multiphase electric machine in response to a gate voltage of the second three terminal semiconductor switch being nonzero. In some embodiments, the system also includes a second three terminal semiconductor switch configured to selectively conduct electricity from one phase of the multiphase electric machine to another phase of the multiphase electric machine through a body diode of the second three terminal semiconductor switch. In some embodiments, the controller, in response to a determination that the multiphase electric machine is unstable, controls the second three terminal semiconductor switch such that electricity is conducted from the one phase of the multiphase electric machine to the other phase of the multiphase electric machine. In some embodiments, the first three terminal semiconductor switch includes a depletion mode MOSFET. In some embodiments, the first three terminal semiconductor switch includes an N-doped semiconductor switch. In some embodiments, the first three terminal semiconductor switch includes a P-doped semiconductor switch.

In some embodiments, a method includes determining whether a multiphase electric machine is unstable, the multiphase electric machine being configured to orient a wheel associated with a rear axle of a vehicle. The method also includes, in response to a determination that the multiphase electric machine is unstable, setting a gate voltage of a first three terminal semiconductor switch to zero. The method also includes, in response to a determination that the multiphase electric machine is stable, setting the gate voltage of the first three terminal semiconductor switch to nonzero. The method also includes, in response to the first three terminal semiconductor switch being set to zero, increasing electrical conduction from one phase of the multiphase electric machine to another phase of the multiphase electric machine. The method includes, in response to the first three terminal semiconductor switch being set to nonzero, increasing electrical resistance from the one phase of the multiphase electric machine to the another phase of the multiphase electric machine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The above discussion is meant to be illustrative of the principles and various embodiments of the present disclosure. Numerous variations and modifications will become apparent to those skilled in the art once the above disclosure is fully appreciated.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. The term "processor" should be understood as encompassing any of the foregoing hardware, either singly or in combination. The terms "signal" and "data" are used interchangeably.

For example, one or more embodiments can include any of the following: packaged functional hardware unit designed for use with other components, a set of instructions executable by a controller (e.g., a processor executing software or firmware), processing circuitry configured to perform a particular function, and a self-contained hardware or software component that interfaces with a larger system, an application specific integrated circuit (ASIC), a Field Programmable Gate Array (FPGA), a circuit, digital logic circuit, an analog circuit, a combination of discrete circuits, gates, and other types of hardware or combination thereof, and memory that stores instructions executable by a controller to implement a feature.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

What is claimed is:

1. A system for a vehicle comprising:
a multiphase electric machine configured to orient a wheel associated with a rear axle of the vehicle; and
a first three terminal semiconductor switch configured to increase electrical conduction from one phase of the multiphase electric machine to another phase of the multiphase electric machine in response to a gate voltage of the first three terminal semiconductor switch being zero, and
the first three terminal semiconductor switch being configured to increase electrical resistance from the one phase of the multiphase electric machine to the other phase of the multiphase electric machine in response to the gate voltage of the first three terminal semiconductor switch being nonzero, wherein the nonzero gate voltage is negative with respect to a source voltage of the first three terminal semiconductor switch.

2. The system of claim 1, further comprising a controller, responsive to operation of the multiphase electric machine being unstable, operates the first three terminal semiconductor switch such that the gate voltage of the first three terminal semiconductor switch is zero.

3. The system of claim 2, further comprising a second three terminal semiconductor switch selectively conducting electricity from the other phase to the one phase through a body diode of the second three terminal semiconductor switch, and the controller, responsive to operation of the multiphase electric machine being unstable, operates the second three terminal semiconductor switch such that electricity is conducted from the other phase to the one phase.

4. The system of claim 1, further comprising a second three terminal semiconductor switch configured to increase electrical conduction from the other phase of the multiphase electric machine to the one phase of the multiphase electric machine in response to a gate voltage of the second three terminal semiconductor switch being zero, and
the second three terminal semiconductor switch being further configured to increase electrical resistance from the other phase of the multiphase electric machine to the one phase of the multiphase electric machine in response to the gate voltage of the second three terminal semiconductor switch being nonzero.

5. The system of claim 1, wherein the first three terminal semiconductor switch includes a depletion mode MOSFET.

6. The system of claim 1, wherein the first three terminal semiconductor switch includes a P-doped semiconductor switch.

7. A system for a vehicle comprising:
a multiphase electric machine configured to orient a wheel associated with a rear axle of the vehicle; and
a controller configured to:
determine whether the multiphase electric machine is unstable;
in response to a determination that the multiphase electric machine is unstable, set a gate voltage of a first three terminal semiconductor switch to zero; and
in response to a determination that the multiphase electric machine is stable, set the gate voltage of the first three terminal semiconductor switch to nonzero wherein the first three terminal semiconductor switch includes an N-doped semiconductor switch.

8. The system of claim 7, wherein the first three terminal semiconductor switch is configured to increase electrical conduction from one phase of the multiphase electric machine to another phase of the multiphase electric machine in response to the gate voltage of the first three terminal semiconductor switch being zero.

9. The system of claim 7, wherein the first three terminal semiconductor switch is configured to increase electrical resistance from one phase of the multiphase electric machine to another phase of the multiphase electric machine in response to the gate voltage of the first three terminal semiconductor switch being nonzero.

10. The system of claim 9, further comprising a second three terminal semiconductor switch configured to increase electrical conduction from the other phase of the multiphase electric machine to the one phase of the multiphase electric machine in response to a gate voltage of the second three terminal semiconductor switch being zero.

11. The system of claim 9, further comprising a second three terminal semiconductor switch configured to increase electrical resistance from the other phase of the multiphase electric machine to the one phase of the multiphase electric machine in response to a gate voltage of the second three terminal semiconductor switch being nonzero.

12. The system of claim 7, further comprising a second three terminal semiconductor switch configured to selectively conduct electricity from one phase of the multiphase electric machine to another phase of the multiphase electric machine through a body diode of the second three terminal semiconductor switch.

13. The system of claim 12, wherein the controller, in response to a determination that the multiphase electric machine is unstable, controls the second three terminal semiconductor switch such that electricity is conducted from the one phase of the multiphase electric machine to the other phase of the multiphase electric machine.

14. The system of claim 7, wherein the first three terminal semiconductor switch includes a depletion mode MOSFET.

15. The system of claim 7, wherein the nonzero gate voltage is positive with respect to a source voltage of the first three terminal semiconductor switch.

* * * * *